UNITED STATES PATENT OFFICE.

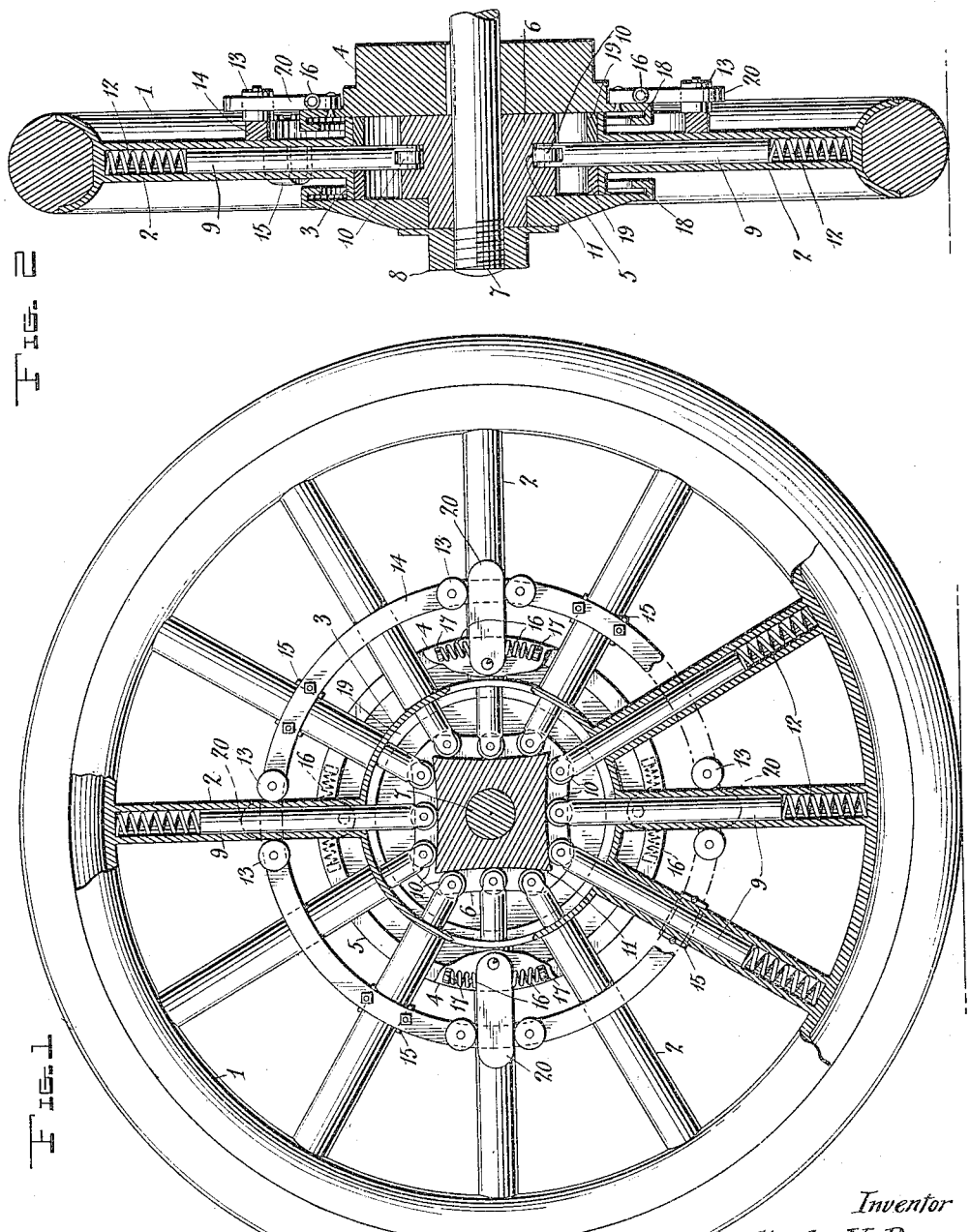

CHARLES V. POPP, OF CHARLESTON, WEST VIRGINIA.

VEHICLE-WHEEL.

1,140,284.  Specification of Letters Patent.  Patented May 18, 1915.

Application filed April 11, 1914. Serial No. 831,221.

*To all whom it may concern:*

Be it known that I, CHARLES V. POPP, a citizen of the United States, residing at Charleston, in the county of Kanawha and State of West Virginia, have invented new and useful Improvements in Vehicle-Wheels, of which the following is a specification.

This invention relates to improvements in resilient wheels, proposing a construction of that type wherein the wheel proper is mounted to "float" relatively to a fixed hub arranged on the axle and cushioning means are interposed between said hub and wheel in such relation as to provide for the ready yielding of the wheel in any direction radially of the hub and to efficiently take up shocks consequent to the yielding of the wheel relatively to the hub and restore the wheel to normal relation with the least amount of counter vibration.

The objects of the invention are to provide a wheel of the type stated which shall efficiently discharge its shock-absorbing function, which is of strong and durable construction, and in which the operating parts are inclosed and protected and furnish strong resilient support for the hub.

An embodiment of the invention is illustrated in the accompanying drawing, wherein:—

Figure 1 is a side elevation, partly in section and partly broken away, showing a wheel in which the features of the invention are incorporated; Fig. 2 is a cross sectional view of the improved wheel.

Similar characters of reference designate corresponding parts in both of the views.

The wheel proper includes a rim 1, hollow spokes 2 and a ring 3 provided at the inner end of the spokes 2 and having openings which aline with said spokes. The rim 3, in effect, forms part of the hub, which in addition to said ring, includes side plates 4 and 5 and a hub body 6 confined between said side plates and mounted on the axle 7. The side plate 5 is arranged at the outer end of the axle and is held in position by a nut 8. The drawings assume that the axle 7 is a "live" or driving axle, in which case, the hub plate 4 is keyed upon or otherwise connected with said axle so as to turn therewith and is utilized to drive the wheel through connections to be described.

The hollow spokes 2 serve as guides for plungers 9 which project well into said spokes and which also project inwardly beyond the spokes and carry at their inner ends rollers 10 which take a frictionless bearing in a groove 11 encircling the hub body 6. The plungers 9 are engaged by expansive coil springs 12 which take their bearing against the rim 1 or the closed ends of the spokes 2 and which resist any movement of said plungers inwardly of said spokes.

The hub body 6 is preferably of square or substantially square outline, its faces, however, being slightly concave. An equal number of plungers 9 engages each of the faces of the hub body 6. Thus, the drawings assume twelve spokes and there are three plungers 9 in engagement with each face of the hub body 6. The pressure of the plungers against the hub body is such as to cause the hub body to turn with the wheel and the relation between the hub body and the spokes is such that the wheel may at all times yield consequent to its engagement with an obstruction or to sudden changes in the speed of the car in the direction of a radius of said hub body. The yielding action of the wheel relatively to the hub body is uniformly transmitted from spoke to spoke as the rotation of the wheel progresses and the number of springs which come into play in resisting the yielding action of the wheel is amply sufficient to provide a strong and relatively stable support for the suspended weight.

The plate 4, when the wheel is mounted on the "live" axle is, as above stated, utilized to drive the wheel and the connections for this purpose preferably include radially disposed arms 20 which are pivotally mounted on said plate and rollers 13 arranged in pairs on a ring 14 secured by clamps 15 to the spokes 2 and arranged concentrically to the rim 1. The arms 20 are arranged between springs 16 which, in turn, take their bearings against lugs 17 located on the plate 4 at each side of the arms; and each arm 20 projects between a pair of rollers 13. The arms 20 transmit power from the plate 4 to the wheel proper but being yieldably mounted relatively to the plate 4 and constantly acted upon by the springs 16, discharge their function without any substantial jars consequent to sudden changes in the speed of rotation of the axle 7. The plates 4 and 5 are provided with peripheral in-turned channels 18 which overhang the ring 3 and trap the oil which is used to lubricate the inner faces of said plates 4 and 5 and also to lubricate the plungers 9 and hub body 6. The ring 3 is preferably faced with rubber at its inner side as at 19, which rubber facing or abutment engages the hub body 6 in case the jars are excessive and provides an additional cushioning agency.

Having fully described my invention, I claim:—

1. In a resilient wheel, in combination, a wheel proper comprising a rim, hollow spokes carried by the rim and a concentric ring provided at the inner ends of the spokes, hub plates arranged at each side of and projecting beyond said ring, a hub body arranged between said plates and inclosed by said rings, the hub body having a plurality of co-extensive angularly disposed faces, plungers arranged within said hollow spokes, springs arranged within said spokes and tending to force the plungers inwardly, and anti-friction rollers provided on the inner ends of the plungers to directly engage the angular faces of said hub body, a like number of plungers coacting with each face of said hub body.

2. In a resilient wheel, in combination, a wheel proper comprising a rim, hollow spokes carried by the rim and a concentric ring provided at the inner ends of the spokes, hub plates arranged at each side of and projecting beyond said ring, a hub body arranged between said plates and inclosed by said ring, plungers arranged within said hollow spokes, springs arranged within said spokes and tending to force the plungers inwardly, the inner ends of the plungers engaging against said hub body, one of the hub plates being utilized to drive the wheel proper and yieldable power-transmitting connections between said driving hub plate and the wheel proper, the connections including pivoted radially disposed arms mounted on said driving hub plate, springs acting upon said arms and rollers carried by the wheel proper and arranged in pairs, each arm working between a pair of rollers.

3. In a resilient wheel, in combination, a wheel proper comprising a rim and hollow spokes carried by the rim, an axle, a hub body mounted thereon, in the plane of the wheel, the hub body having a plurality of co-extensive angularly disposed faces, plungers arranged within said hollow spokes, springs arranged within said spokes and tending to force the plungers inwardly and anti-friction rollers provided on the inner ends of the plungers to directly engage the angular faces of said hub body, a like number of plungers co-acting with each of said angular faces of said hub body.

In testimony whereof I have hereunto set my hand in presence of two subscribing witnesses.

CHARLES V. POPP.

Witnesses:
C. RIGGS,
A. C. ONCUTT.

Copies of this patent may be obtained for five cents each, by addressing the "Commissioner of Patents, Washington, D. C."